United States Patent [19]

Schultz

[11] 4,412,262
[45] Oct. 25, 1983

[54] MOUNT FOR MAGNETIC RECORDER TRANSDUCER

[75] Inventor: Earl R. Schultz, Denver, Colo.

[73] Assignee: Honeywell Inc., Minneapolis, Minn.

[21] Appl. No.: 316,262

[22] Filed: Oct. 29, 1981

[51] Int. Cl.³ .............................................. G11B 21/24
[52] U.S. Cl. ................................................... 360/109
[58] Field of Search ................. 360/109, 105, 104, 128

[56] References Cited

U.S. PATENT DOCUMENTS

| | | | |
|---|---|---|---|
| 3,123,811 | 3/1964 | Mutziger | 360/109 |
| 4,003,092 | 1/1977 | Hirata | 360/109 |
| 4,319,293 | 3/1982 | Tomabechi | 360/109 |
| 4,329,724 | 5/1982 | Clayton | 360/109 |

Primary Examiner—Alfred H. Eddleman
Attorney, Agent, or Firm—Lockwood D. Burton; Mitchell J. Halista

[57] ABSTRACT

A mounting arrangement for magnetic record transducers wherein a single locking screw is provided for clamping each transducer in position. Additionally there is provided, for each transducer assembly, a pair of adjusting members such as set screws, each of which has an eccentric boss projecting from the end thereof. Each of the adjusting screws fits snugly in a correspondingly threaded hole in the mounting bracket while the eccentric pin or boss cooperates with a longitudinally oval recess in the end of the transducer assembly. The external end of each of the adjusting screws is keyed to indicate the relative position of the eccentric boss at the opposite end thereof. The two adjusting screws are positioned on opposite sides of the clamping screw and are effective to provide both lateral and angular adjustment of the transducer relative to the mounting bracket. When the transducer is properly adjusted, the locking screw is tightened to clamp the transducer in position. All of this may be accomplished from the front of a magnetic recording apparatus to greatly facilitate proper adjustment thereof.

10 Claims, 11 Drawing Figures

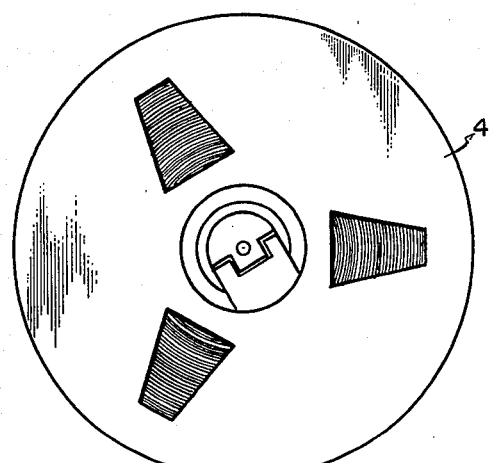
FIG. 1
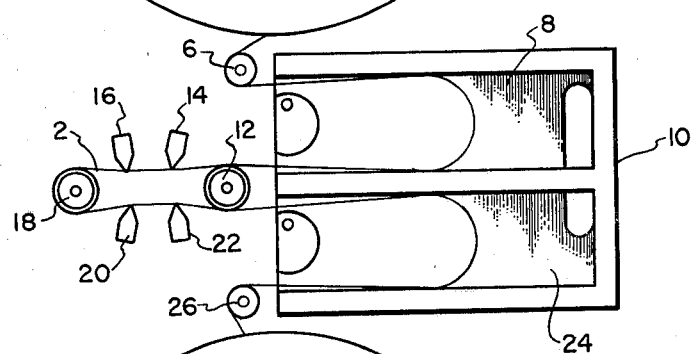
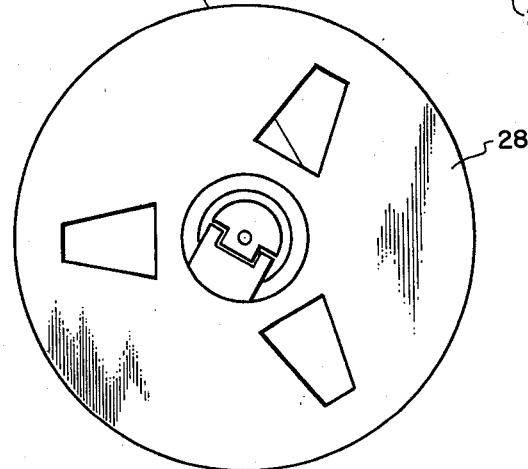
FIG. 2
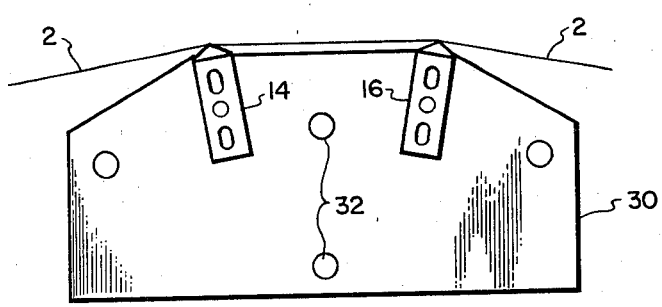

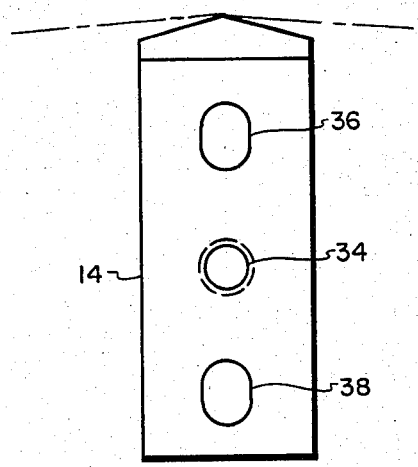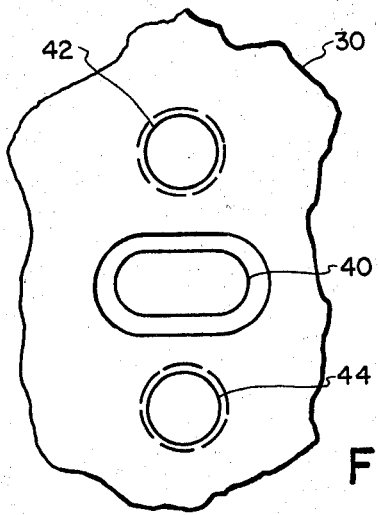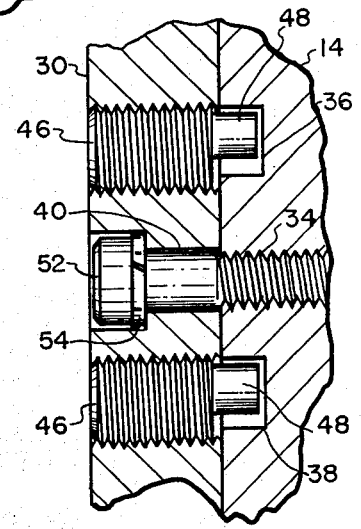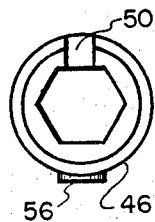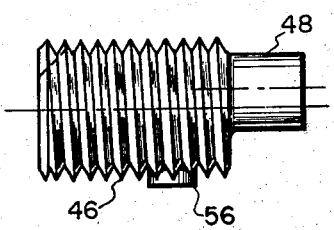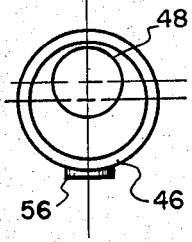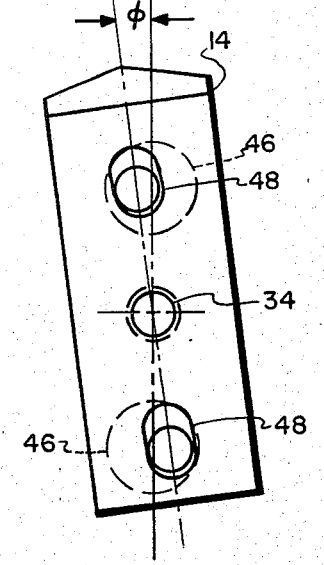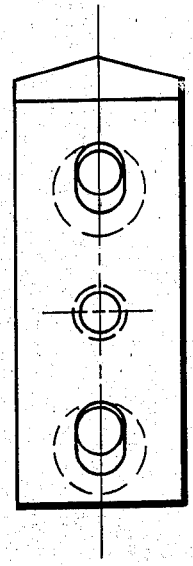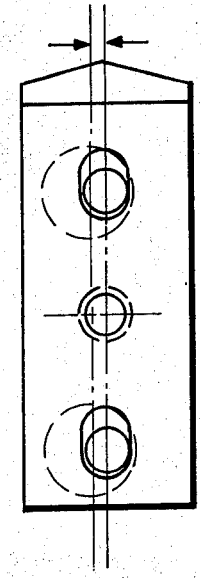

MOUNT FOR MAGNETIC RECORDER TRANSDUCER

BACKGROUND OF THE INVENTION

The present invention relates to magnetic recording apparatus. More particularly, it relates to mounting means for mounting the magnetic record and playback transducers.

In certain types of magnetic recording instruments, especially those used for the recording of scientific and technical data on a plurality of parallel tracks on a relatively wide magnetic record, the transducers are aligned with respective tracks and frequently arranged in pairs of transducer assemblies which are a predetermined distance apart along the direction of motion of the recording member. The longitudinal spacing of those transducer assemblies must be extremely precise to maintain a correlation among the parallel tracks. Additionally, the angle at which the transducer assemblies engage the surface of the magnetic record is also highly critical.

Heretofore, the positional adjustment of the transducer assemblies has been accomplished with considerable difficulty through a time consuming procedure. For example, the transducers were secured to a mounting bracket or support member by a pair of screws which pass through oversize holes in the transducer. The procedure involved repeatedly and selectively loosening one or the other of the two mounting screws and adjusting the position of the head from behind with a fork like tool. Then the position and angle of the heads is tested in operation after each attempted adjustment. It has been found that such adjustments are significantly time consuming, e.g., occupying up to an hour to accomplish the proper adjustment.

SUMMARY OF THE INVENTION

It is, accordingly, an object of the present invention to provide an improved mounting means for magnetic signal transducers.

It is another object of the present invention to provide mounting means as set forth which obviates the foregoing shortcomings.

In accomplishing these and other objects, there has been provided, in accordance with the present invention, a mounting arrangement for magnetic record transducers wherein a single locking screw is provided for clamping each transducer in position. Additionally there is provided, for each transducer assembly, a pair of adjusting members such as set screws, each of which has an eccentric boss projecting from the end thereof. Each of the adjusting screws has a threaded portion that fits snugly in a correspondly threaded hole in the mounting bracket while the eccentric pin or boss cooperates with a longitudinally oval recess in the end of the transducer assembly. The external end of the adjusting screws is keyed to indicate the relative position of the eccentric boss at the opposite end thereof. The two adjusting screws are positioned on opposite sides of the clamping screw and provide both lateral and angular adjustment of the transducer relative to the mounting bracket and when properly adjusted the locking screw is tightened to clamp the transducer in position.

BRIEF DESCRIPTION OF THE DRAWINGS

A better understanding of the present invention may be had from the following detailed description when read in the light of the accompanying drawings, in which:

FIG. 1 is a schematic pictorial diagram illustrating the environment of the present invention;

FIG. 2 is a pictorial representation of a head mounting structure embodying the present invention;

FIG. 3 is an end view of a transducer assembly embodying features of the present invention;

FIG. 4 is a fragmentary view of a portion of a mounting bracket embodying features of the present invention;

FIGS. 5, 6 and 7 are top, side and bottom views, respectively of the transducer assembly illustrating the adjusting element of the apparatus in accordance with the present invention;

FIG. 8 is a cross-sectional side view of a transducer assembly embodying the present invention;

FIGS. 9, 10 and 11 are separate views illustrating adjustable features of the apparatus in accordance with the present invention.

DETAILED DESCRIPTION

Referring now to the drawings in more detail, there is shown in FIG. 1 a schematic representation of a magnetic tape recorder which is suitable for the embodiment of the present invention. A magnetic tape 2 is drawn from a supply reel 4 over an idler roller 6. The tape 2 passes from the idler roller 6 into a first chamber 8 in a vacuum bin structure 10. From the first chamber 8 of the vacuum bin structure 10, the magnetic tape 2 is drawn past an isolating roller 12, thence past a pair of transducers 14 and 16 by a capstan 18. After passing over the capstan 18, the magnetic tape 2 moves past a second pair of transducers 20 and 22, respectively. The tape then, again passes the isolating roller 12 and into the second chamber 24 of the vacuum bin 10. From the second chamber 24, the tape travels over a second idler roller 26 and onto a take-up reel 28.

The actual motion of the tape 2 past the transducers 14, 16, 20 and 22 is controlled by the capstan 18. The soft loops of tape in the chambers 8 and 24, together with the isolating roller 12, isolate that portion of the tape in engagement with the transducers from the motion artifacts of the reels 4 and 28, as well as providing a low inertia operation for demanded starts and stops of the tape again in the area of the transducers 14, 16, 20 and 22.

In the structure shown in FIG. 1, the transducers 14 and 16 are both record transducer assemblies while the transducers 20 and 22 are both playback or reproduce transducer assemblies. Each of the record transducer assemblies 14 and 16 include a plurality of individual track transducers. Those individual transducers are so spaced relative to each other that the individual transducers of the assembly 14 engage alternate tracks on the magnetic record member 2 while the individual transducers of the assembly 16 engage the alternate tracks interleaved between those tracks engaged by the transducers of the assembly 14. The playback transducer assemblies 20 and 22 are similarly arranged. The magnetic tape 2 is held into engagement with the operating end of the transducer assemblies by the tension in the tape created between the capstan 18, the isolating roller 12 and the vacuum chambers 8 and 24. Thus, each of the transducer assemblies causes a slight deviation in the path of the record member 2 as it passes between the roller 12 and the capstan 18. Since the individual transducers operate on interleaved alternate tracks, the spacing between the transducer assembly 14 and the transducer assembly 16 at the point of engagement with the magnetic tape 2 must be very accurately determined inasmuch as the data on the several tracks is time correlated.

In order for the recorded data to be read or reproduced in proper time relationship, the reproduce transducers 20 and 22 must also be accurately positioned with exactly the same distance between the operating ends of the transducers 20 and 22 as the distance between the transducers 14 and 16. In order that the recorded data may be read from the tape on any other machine of the same general type, that distance must conform to a predetermined standard. Inasmuch as the path of the record member 2 is caused to be slightly deviated at the contact point with each of the transducer assemblies 14, 16, 20 and 22, in order to maintain proper operating contact with the record member 2, each of the transducers must be positioned at a precise angle relative to each other and to the tape path while still maintaining the exact separation distance between the transducer assemblies.

In order to accomplish the precise positioning of the transducer assemblies, the transducer assemblies of each pair are mounted on a suitable mounting bracket 30 as shown in FIG. 2. The mounting bracket 30 is basically rectangular in configuration with a raised center portion in the vicinity of the transducers 14 and 16. The bracket is arranged to be firmly secured to the instrument chassis by means such as screws extending through the holes 32. In an apparatus constructed in accordance with the present invention, the transducer assemblies 14 and 16, as are the transducers 20 and 22, are arranged to be secured to the mounting bracket 30 from either end. While in FIG. 2, the transducer assemblies 14 and 16 are illustrated from the opposite side as compared to the arrangement illustrated in FIG. 1, the free end of each of the transducer assemblies 14 and 16 also include the mounting and adjusting recesses which would appear at the end of the transducer assemblies adjacent the mounting bracket 30.

These apertures are more clearly illustrated in FIGS. 3 and 4. Since, for the purposes of this description, all of the transducer assemblies 14, 16, 20, 22 are effectively identical, FIG. 3 will be described with respect to transducer assembly 14. In FIG. 3, the transducer assembly 14 is shown from one end thereof. The individual transducer elements, not shown, are supported in a mounting block which is substantially rectangular in cross-section. At approximately the middle of the rectangular cross-section of the end of the transducer assembly 14, and substantially on the longitudinal center-line thereof, there is a threaded hole 34. On respective opposite sides of the hole 34 and along the longitudinal axis or longitudinal center-line of the block 14 there are provided a pair of oval slots 36 and 38. The slots 36 and 38 extend longitudinally along the longitudinal axis of the mounting block of the transducer assembly 14.

In FIG. 4, there is shown a fragmentary portion of the mounting bracket 30 which is to be used with the transducer assembly 14. This mounting bracket 30 also has openings which are cooperatively positioned with respect to the corresponding openings in the transducer assembly block 14. Thus, in the bracket 30 there is a horizontally or transversely oriented oval opening 40. On respective opposite sides of the opening 40, there are a pair of threaded holes 42 and 44.

In FIGS. 5, 6 and 7 are shown top, side and bottom views, respectively of an adjusting screw 46. The adjusting screw 46 has, as seen in FIG. 5, a screwdriver recess in one end thereof into which an adjusting tool such as an Allen wrench may be inserted for purposes of adjusting the screw 46. At the opposite end of the screw 46, as shown in FIGS. 6 and 7, there is a pin 48 located eccentrically with respect to the longitudinal axis of the screw 46 and extending outwardly from the end of the screw 46 along an axis parallel to the longitudinal axis of the screw 46. Again referring to FIG. 5, it may be seen that the end of the adjusting screw 46 adjacent to the recess is provided with an indicium or notch 50 which is in substantial alignment with and indicative of the orientation of the pin 48.

As may be seen in FIG. 8, a relatively longer mounting or clamping screw 52 extends through the slot 40 in the mounting bracket 30 and into the threaded hole 34 in the mounting block of the transducer 14. Before the transducer assembly 14 is secured to the mounting bracket 30 by the screw 52, one each of the adjusting screws 46 is screwed into the threaded holes 42 and 44 of the mounting bracket 30 with the pin 48 thereof extending beyond the face of the mounting bracket 30. Also it is preferred that the pin 48 be oriented in the twelve o'clock position as illustrated in FIG. 10. Then when the transducer assembly 14 is secured to the mounting bracket 30 by the screw 52, the pins 48 will extend, respectively, into the elongated slots 36 and 38. The slots 36 and 38 are of a width which is commensurate with the thickness of the pins 48. These slots 36, 38 are of a longitudinal dimension to accomodate substantially a half-circle arc of movement of the pins 48. One or more washers 54 may be positioned between the head of the screw 52 and the face of the mounting bracket 30.

When the transducer assembly 14 is secured to the mounting bracket 30 by the screw 52 as shown in FIG. 8, if the screw 52 is slightly loosened, the adjusting screws 46 may be selectively moved to effect a proper adjustment of the position of the transducer assembly relative to the mounting bracket 30 as illustrated in FIGS. 9, 10 and 11.

In effecting the adjustment of the transducers to provide the proper positioning thereof, the preferred approach is to adjust the position of the reproduce or playback transducers 20 and 22 first. To accomplish that, a control tape with a pre-recorded standard signal record is placed on the reels 4 and 28 and run through the tape transport system to provide a standard signal against which the adjustment of the reproduce transducers 20 and 22 may be effected. To physically adjust the position of the reproduce transducers 20 and 22, the corresponding screws 52 are slightly loosened to provide a measure of freedom of motion of the reproduce transducers 20 and 22. The corresponding screws 46 may then be adjusted as shown in FIGS. 9, 10 and 11 to provide the desired position and angle for the two reproduce heads 20, 22. This will be determined by monitoring the reproduced signal as read from the control tape.

As the corresponding screws 46 being turned selectively through an angle of approximately 180 degrees, the pins 48 cooperate, respectively, with the elongated slots 36 and 38 in the end of the reproduce transducer assembly to produce the desired angular and spacial positioning. The transverse elongated opening 40 through the mounting bracket 30 allows for a lateral displacement relative to the nominal center-line such as illustrated in FIG. 11 but does not accommodate any appreciable vertical motion of the transducer assembly with respect to the mounting bracket 30. The reproduced signals from the standard tape are monitored and, when the desired result has been achieved by virtue of the adjustment of the adjusting screws 46, the screw 52 is tightened to clamp the respective reproduce transducers 20, 22 into the adjusted position.

After the reproduce transducers 20, 22 have thus been adjusted and clamped in position, the precorded control tape is removed from the tape transport apparatus and replaced with a blank tape. The tape transport is then turned on and a standard or fixed signal is applied to the record transducers 14 and 16 for recording on the tape too. The recorded signal is subsequently detected by the now properly adjusted reproduce transducers 20, 22 and the resulting signal is monitored. With the tape running and the signals being applied thereto, the record transducers 14, 16 may then be adjusted in the same manner as that followed for the adjustment of the reproduce transducers 20, 22. When the record transducers 14, 16 have been properly adjusted to provide the desired output signals at the reproduce transducers 20,22, the screw 52 again may be tightened to clamp the respective record transducers 14 and 16 in the properly adjusted positions.

It should be noted that the adjustment both of the reproduce and the record transducers is accomplished from the front of the tape transport machine with the machine continuously operating. To facilitate such a front of the machine adjustment, the notch 50 in the forward end of each of the adjusting screws 46 indicates the then present position of the adjusting pin 48 at the opposite end thereof. With this arrangement, the operator who is making the adjustments is constantly aware of exactly where the adjusting pin 48 is relative to the adjusting structure. The slots 36 and 38 in the end of the transducer assembly are of sufficient width to accommodate the thickness of the pin 48 without excessive tolerance laterally. The longitudinal dimension of the slots 36 and 38 is sufficient to allow a freedom of movement of the pin 48 in the vertical direction as it is turned through the desired half-circle arc of rotation. Thus the rotation of the pins causes a relative movement of the transducer relative to the fixed mounting bracket 30. In the form illustrated, the lower adjusting screw, with its pin 48 extending into the slot 38 tends primarily to affect a rotational motion of the transducer to adjust the angular position thereof with the nominal center-line, relative to the contact point with the tape to adjust the "wrap" of the tape about the transducer head for a maximum data transfer. On the other hand, the upper adjusting screw, with its pin 48 operating in the slot 36 of the transducer tends primarily to effect the lateral spacing of the transducer relative to the nominal center-line of the transducer assembly relative to the fixed plate or bracket 30 to adjust the spacing between the transducer pairs.

Thus, there has been provided, in accordance with the present invention, an improved transducer mounting arrangement for magnetic tape recorders which facilitates the positional adjustment of the transducers to accomplish the precision required for high quality magnetic recording apparatus.

The embodiments of the invention in which an exclusive property or privilege are claimed is defined as follows:

1. A magnetic tape recorder apparatus having a transducer assembly, and mounting means for said transducer assembly, said mounting means comprising:
   a fixed mounting bracket having a front surface and a rear surface;
   adjustable cam means carried by said fixed mounting bracket having a cam element extending beyond said rear surface, said cam means being accessible for adjustment from said front of said bracket, said cam means including a screw structure and said mounting bracket having a threaded hole with said screw structure being threaded into said threaded opening to allow a rotation of said screw structure, said cam means further including a pin extending from one end of said screw structure with said pin being positioned eccentrically with respect to the axis of said screw structure,
   said transducer assembly including a mounting block means on which one or more magnetic signal transducers are securely mounted;
   said mounting block means having recess means arranged to cooperatively engage said pin extending from said cam element, and
   securing means accessible from said front surface of said bracket for selectively securing said mounting block to said rear surface of said bracket;
   said cam means being adjustable to selectively select a position of said transducer assembly relative to said bracket.

2. A magnetic tape recorder apparatus as set forth in claim 1 wherein said screw structure has a screw driver recess in one end thereof opposite to the end having said pin.

3. A magnetic tape recorder apparatus as set forth in claim 1 wherein said recess means in said mounting block comprises an elongated slot having a width commensurate with said pin and a length extending in the direction of the longitudinal center-line of said mounting block a distance to accommodate a half-circle arc of movement of said pin.

4. A magnetic tape recorder apparatus having a transducer assembly, and mounting means for said transducer assembly, said mounting means comprising;
   a fixed mounting bracket having a front surface and a rear surface;
   adjustable cam means carried by said fixed mounting bracket having a cam element extending beyond said rear surface, said cam means being accessible for adjustment from said front surface of said bracket,
   said transducer assembly including a mounting block means in which one or more magnetic signal transducers are securely mounted;
   said mounting block means having recess means arranged to cooperatively engage said cam element, and
   securing means accessible from said front surface of said bracket for selectively securing said mounting block to said rear surface of said bracket;
   said cam means being adjustable to selectively adjust the position of said transducer assembly relative to said bracket, wherein said adjustable cam means includes a first and a second screw structure each of said first and second screw structures being carried in an associated threaded opening through said mounting bracket, said threaded openings being spaced apart along the line nominally co-incident with the longitudinal center line of said transducer mounting block; said cam element comprising a pin extending from one end of each said screw structure, each of said pins being positioned eccentrically with respect to the access of the respective screw structures and arranged to cooperate with said recess means.

5. A magnetic tape recorder apparatus as set forth in claim 4 wherein said recess means in said mounting block comprises a first and a second elongated slot, each said slot having a width commensurate with said pins and a length extending in the direction of the longitudinal cener-line of said mounting block a distance to accommodate a half-circle arc of movement of the associated one of said pins.

6. A magnetic recorder apparatus as set forth in claim 5 wherein said securing means comprises a clamping screw extending through a transversely elongated aperture in said mounting bracket and into a threaded recess in said mounting block.

7. A magnetic recorder apparatus as set forth in claim 6 wherein said securing means is located between said first and second adjustable screw structure of said cam means.

8. A magnetic recorder apparatus as set forth in claim 7 wherein each of said screw structures includes an indicium on the recessed end thereof indicative of the relative position of the pin at the opposite end of said screw sructure.

9. A magnetic recorder apparatus as set forth in claim 1 wherein said securing means comprises a clamping screw extending through a transversely elongated apperture and said mounting bracket and into a threaded recess in said mounting block.

10. A magnetic recorder apparatus as set forth in claim 1 wherein said screw structure includes an indicium on said screwdriver recess thereof indicative of the relative position of said pin at the opposite end of said screw structure.

* * * * *